US006650339B1

United States Patent
Silva et al.

(10) Patent No.: US 6,650,339 B1
(45) Date of Patent: Nov. 18, 2003

(54) THREE DIMENSIONAL MODELING AND ANIMATION SYSTEM

(75) Inventors: Daniel David Silva, San Rafael, CA (US); Rolf Walter Berteig, Seattle, WA (US); Donald Lee Brittain, Santa Barbara, CA (US); Thomas Dene Hudson, Port Washington, WI (US); Gary S. Yost, San Francisco, CA (US)

(73) Assignee: Autodesk, Inc., San Rafael, CA (US)

(*) Notice: Subject to any disclaimer, the term of this patent is extended or adjusted under 35 U.S.C. 154(b) by 592 days.

(21) Appl. No.: 09/282,590

(22) Filed: Mar. 31, 1999

Related U.S. Application Data

(63) Continuation of application No. 08/903,958, filed on Jul. 31, 1997.
(60) Provisional application No. 60/025,117, filed on Aug. 2, 1996.

(51) Int. Cl.[7] ............................................. G06T 17/40
(52) U.S. Cl. ....................... 345/619; 345/645; 345/650; 345/661; 345/676
(58) Field of Search ................................ 345/433, 419, 345/427, 619, 645, 650, 653, 654, 661, 664, 665, 676, 679, 680

(56) References Cited

U.S. PATENT DOCUMENTS 5,583,977 A * 12/1996 Seidl ........................... 345/433

OTHER PUBLICATIONS

Lau–Kee et al. "VPL: An Active, Declarative Visual Programming System". Proceedings of IEEE Workshop on Visual Languages, 1991. pp. 40–46, Oct. 1991.*

* cited by examiner

Primary Examiner—Mark Zimmerman
(74) Attorney, Agent, or Firm—Hickman Palermo Truong & Becker LLP

(57) ABSTRACT

A three dimensional (3D) modeling system for generating a 3D representation of a modeled object on a display device of a computer system. The modeled object is represented by an initial definition of an object and a set of modifiers. Each modifier modifies some portion of the definition of an object that may result in a change in appearance of the object when rendered. The modifiers are ordered so that the first modifier modifies some portion of the initial definition of the object and produces a modified definition. The next modifier modifies the results of the previous modifier. The results of the last modifier are then used in rendering processes to generate the 3D representation. Each modifier is associated with a three dimensional representation so that the user can more easily visualize the effect of the modifier.

20 Claims, 14 Drawing Sheets

THREE DIMENSIONAL MODELING AND ANIMATION SYSTEM

RELATED APPLICATIONS

This application claims the benefit of the U.S. nonprovisional patent application number 08/903,958, entitled "THREE DIMENSIONAL MODELING AND ANIMATION SYSTEM," filed Jul. 31, 1997, by inventors Daniel D. Silva, Rolf Walter Berteig, Donald Lee Brittain, Thomas Dene Hudson, Gary S. Yost, which is incorporated herein by reference.

This application claims the benefit of U.S. provisional patent application No. 60/025,117, entitled, "Three Dimensional Modeling and Animation System," filed Aug. 2, 1996, by inventors Rolf Walter Berteig, Daniel David Silva, Donald Lee Brittain, Thomas Dene Hudson, and Gary S. Yost, which is incorporated herein by reference.

COPYRIGHT DISCLAIMER

A portion of the disclosure of this patent document contains material which is subject to copyright protection. The copyright owner has no objection to the facsimile reproduction by anyone of the patent disclosure, as its appears in the Patent and Trademark Office patent files or records, but otherwise reserves all copyright rights whatsoever.

BACKGROUND OF THE INVENTION

A. Field of the Invention

The invention relates generally to field of three dimensional modeling and animation. In particular, the invention relates to an improved three dimensional modeling and animation system having an object oriented architecture.

B. Related Art

Three dimensional modeling systems allow users to generate models of three dimensional objects using computers. In previous systems, a user defines a simple three dimensional (3D) object and then applies various modifications (e.g., stretch, bend) to that object. The modifications change the way the object looks. To apply a modification, a user is prompted with a dialog box to fill in the values of the modification. The user then applies the modification to the object and views the results.

One problem with such a system is that the user does not have a good idea of how a specific modification will affect an object until after the modification is applied to the object. Additionally, it can be difficult to understand exactly how a specific modification affects an object from the look of the object after the modification is applied. This is because it can be difficult to understand the interactions between various modifications, already applied to the object, and the new modification.

Therefore, it is desirable to have a 3D modeling system that is simpler for the user to use by allowing the user to better understand how a particular modification to an object will affect the look of that object.

SUMMARY OF THE INVENTION

One embodiment of the invention includes a method of generating a three dimensional (3D) representation of a modeled object on a display device of a computer system. The modeled object is represented by an initial definition of an object and a set of modifiers. Each modifier modifies some portion of the definition of an object that may result in a change in appearance of the object when rendered. The modifiers are ordered so that the first modifier modifies some portion of the initial definition of the object and produces a modified definition. The next modifier modifies the results of the previous modifier. The results of the last modifier are then used in rendering processes to generate the 3D representation.

In one embodiment, the modifiers are easily shared, the order of the modifiers is easily changed, and the values associated with the modifiers is also easily changed. These features provide the user with great flexibility in modeling and animation.

In one embodiment, the modifiers are associated with three dimensional visual representations that allow a user to better visualize and change the effect of a particular modifier.

In one embodiment, intermediate channel results created during the generation of a representation of an object are cached thereby increasing the speed of this embodiment. In particular, the representation of the object is generated in multiple channels, each channel representing some portion of that representation. Intermediate channel results are generated in each channel by elements in that object's list of modifiers. Depending on for how long these intermediate channel results are valid, the intermediate channel results may or may not be cached. In particular, in one embodiment, if it is determined that one set of intermediate channel results will be valid for a predetermined period of time, while the next intermediate channel results in that channel will not be valid for a predetermined period of time, then the intermediate channel results are cached.

BRIEF DESCRIPTION OF THE DRAWINGS

These and other features and advantages of the invention will become more apparent to those skilled in the art from the following detailed description in conjunction with the appended drawings in which.

The figures illustrate the invention by way of example, and not limitation. In the figures, like references indicate similar elements.

DETAILED DESCRIPTION

A. Terminology

In this description, the term "instance" means an instance of class as in an object oriented programming language. In particular, "instance" does not mean an instance as defined in the 3D Studio Max™ User Guide, Volume 1 and 2, unless specifically noted. Also note that an "instance" in the object oriented sense can also be an "instance" in the 3D Studio Max™ application sense.

The term "reference" generally means a reference created through the use of the ReferenceTarget and ReferenceMaker classes, or the like, as described below.

B. System Overview

One embodiment of the invention includes an apparatus and method of generating a three dimensional (3D) representation of a modeled object on a display device of a computer system. The description of specific applications is provided only as examples. Various modifications to the preferred embodiments will be readily apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein.

C. Computer System

Figure 1:
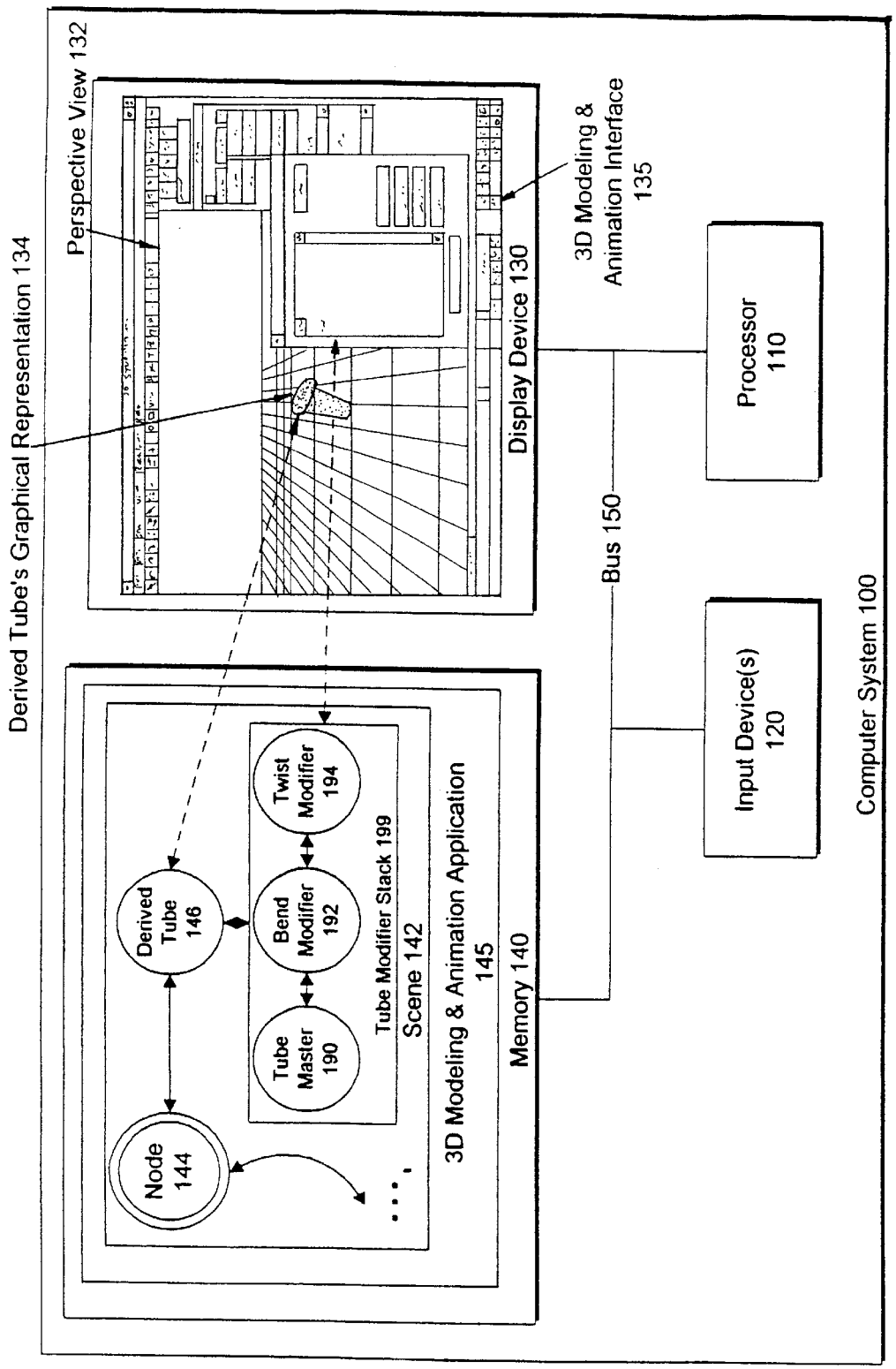
FIG. 1 illustrates a 3D modeling and animation system according to one embodiment of the invention.

FIG. 1 illustrates a computer system 100 that can be used to implement the one embodiment of the invention. FIG. 1 also illustrates an example of a tube as modeled by one embodiment of the invention. The following describes the elements of FIG. 1 and then their operation.

The computer system 100 comprises a processor 110, a memory 140, an input device 120 and a display device 130. These components can communicate with each other via a bus 150. The memory 140 includes software such as the 3D modeling and animation application 145. The 3D modeling and animation application 145 includes, among other things, a scene 142. The scene 142 includes at least a first node 144, a corresponding derived tube 146 and a tube modifier stack 199. The tube modifier stack 199 includes a tube master 190, a bend modifier 192, and a twist modifier 194. The display device 130 displays the 3D modeling and animation interface 135 which shows a 3D representation of the derived tube 146 and the corresponding tube modifier stack 199.

The computer system 100 includes an IBM compatible personal computer, available from Hewlett-Packard, Inc. of Mountain View, Calif. In another embodiment, the computer system 100 includes one of a Macintosh™ computer, available from Apple Computer, Inc. of Cupertino, Calif., a SparcStation™ workstation, available from Sun Microsystems, Inc., of Mountain View, Calif., and a workstation from Silicon Graphics, Inc. of Mountain View, Calif. In one embodiment, the computer system 100 executes an operating system such as Windows 95™ or Windows NT™, available from Microsoft, Inc. of Redmond, Wash.

The computer system 100 need only have some type of processor 110 for executing instructions and manipulating data. In one embodiment, the processor 110 includes a distributed processing system such that processing is done by a number of networked microprocessors.

The memory 140 stores data and instructions. The memory 140 includes one or more of: a random access memory, a read only memory and a hard disk memory.

The input device 120 allows the user to interact with the 3D modeling and animation application 145. The input device 120 includes one or more of: a keyboard, a mouse, and a trackball. Importantly, the input device 120 includes some device allowing the user to interact with the 3D modeling and animation application 145.

The display device 130 displays the 3D modeling and animation interface 135. The display device 130 includes a cathode ray tube (CRT) display, flat panel display, or some other display device. In the example of FIG. 1, the 3D representation of the scene 142 is shown in a perspective view 132.

The 3D modeling and animation application 145 includes data and instructions for creating 3D models, photo-realistic still images, and film quality animation. The 3D modeling and animation application 145 uses a process called "rendering" to determine the correct display device 130 representation of the scene 142. One embodiment of the invention includes the application 3D Studio Max™, available from Autodesk, Inc. of San Rafael, Calif.

The scene 142 includes all the objects to be displayed in the 3D modeling and animation interface 135. An object is thus something in a scene 142. Further, an object is a model of a physical object, such as a cylinder, tube, box or teapot, or an object is a non-physical object used in modeling other objects, such as a wave, a bomb, or a deflector. Each object corresponds to a graphical representation in the 3D modeling and animation interface 135. Of course, some objects may not be displayed because, for example, the display options in the 3D modeling and animation interface 135 do not allow that particular object to be displayed, because one object is blocking another object, or because the user has requested that the object not be displayed. Objects are described in greater detail below.

The scene 142 is made up of a number of nodes, such as node 144. Each node is associated with some object. In the example of FIG. 1, the node 144 is associated with a derived tube 146 object. The derived tube 146 is a model of a physical object; in this case, a tube that has been bent and twisted. The bent and twisted tube is shown as the derived tube's graphical representation 134. Note the invention allows for much more visually complex objects to be rendered, but for FIG. 1, an example of a relatively simple object is described.

The derived tube 146 has a modifier stack, labeled as tube modifier stack 199. The tube modifier stack 199 is a simplified example of a modifier stack. The modifier stack is described in greater detail below. The tube modifier stack 199 includes the tube master 190 (a parametric object), the bend modifier 192 and the twist modifier 194. The tube master 190 includes a parametric definition of a tube, e.g. a tube has an inner radius, an out radius and a height. The bend modifier 192 modifies the definition of the tube so that the tube will appear bent. The twist modifier 194 modifies the definition of the bent tube so that the bent tube is also twisted. How the modifiers work in connection with the master objects is described in greater detail below. However, importantly, the use of modifier stacks, in one embodiment of the invention, provides the user with previously unequaled ease of use and flexibility in 3D modeling and animation.

The following describes the general operations in the computer system 100 used in the rendering process. The computer system 100, using the processor 110 and the memory 140, executes the 3D modeling and animation application 145 which renders a three-dimensional (3D) representation of the scene 142 on the display device 130. As part of the rendering process, the derived tube 146 provides a parametric definition of a bent and twisted tube for use by the 3D modeling and animation application 145. In this step, the derived tube 146 accesses the tube modifier stack 199 to generate the parametric definition of the bent and twisted tube. The 3D modeling and animation application 145 uses the parametric definition and various rendering techniques to generate the derived tube's graphical representation 134. The 3D modeling and animation application 145 then causes the display device to display the perspective view 132, including the derived tube's graphical representation 134. Thus, given a scene with a derived object, the computer system 100 can render a representation of that object.

The above has described an overview of a computer system that supports 3D modeling and animation using modifier stacks. The next section describes the class hierarchy used in the 3D modeling and animation application 145 that enable the use of modifier stacks. Following the next section is a description of the how these classes are used together in the application.

D. Objects and Their Relation to Scenes

In one embodiment of the invention, the 3D modeling and animation application 145 has an object oriented design. Thus, the application has a class hierarchy that supports inheritance. This section describes the class hierarchy used to create modifier stacks. Table 1 illustrates the class hierarchy in one embodiment of the 3D modeling and animation application 145. Each of the classes is described below.

TABLE 1

Animatable
  ReferenceMaker
    ReferenceTarget
      BaseObject
        Modifier
        Object
          GeometricObject
            TriObject
            SimpleObject
            PatchObject
            ParticleObject
              SimpleParticle
          ShapeObject
            SplineShape
            SimpleSpline
            LinearShape
            SimpleShape
          WorldSpaceModifierObject
            SimpleWorldSpaceModifierObject i. Animatable Class The Animatable class is the superclass of all the animatable classes. Although no instances of Animatable are used, instances of the Animatable's subclasses include methods that support the animation of an instance of that particular subclass. Also, the Animatable class includes a class identifier and associated properties.

ii. ReferenceMaker & ReferenceTarget

The ReferenceMaker class and the ReferenceTarget classes work together to support references between objects in a scene. A reference within a scene occurs when one object depends upon another object for rendering. For example, one embodiment of the invention allows different objects (e.g. two derived tubes) to share the same master object. In this example, the master object becomes the target of references from the objects. The reference allows a scene to be rendered and allows for the use of modifiers by multiple objects. As is described below, this use feature provides a user with significant benefits over previous systems. The reference also allows changes in the master object to be broadcast to any objects that are referring to that master object. The ReferenceMaker class includes the methods for indicating that a particular instance depends on another instance. The ReferenceMaker class also includes methods for receiving messages from reference target objects when changes are made to that reference target object. The ReferenceTarget class includes the methods for indicating that a particular instance is a target of a reference. The ReferenceTarget class supports the broadcast of messages to all referring reference maker objects about changes to that reference target object. As with the Animatable class, no instances of ReferenceMaker or ReferenceTarget are used in the application, instances of these classes' subclasses are used instead.

In one embodiment of the invention, references support a technique called lazy evaluation. Lazy evaluation increases the performance of the 3D modeling and animation application 145. The purpose of lazy evaluation is to reduce the number of unnecessary calculations by not performing any evaluations until specifically requested.

The following describes an example of lazy evaluation. Assume that to properly render a first object, that first object must receive data from a second object (e.g., the first object includes an instance of a LinkedXForm which uses the local coordinate space of the second object to scale the first object. LinkedXForms are described below). This relationship is established via a reference from the first object to the second object. If the data in the second object is changed, then the second object will broadcast the change to the first object. In lazy evaluation, the first object does not recalculate any changed values (e.g., its geometry parameters) until the first object is specifically requested (e.g., a request to provide a derived object representation, described below). In lazy evaluation, the first object merely marks its dependent values as no longer valid. Thus, the first object does not precompute the new values until it needs to provide these values.

iii. BaseObject

The BaseObject class includes the methods for providing a three dimensional graphical representation of an object on the display device 130. The BaseObject class includes methods for providing different display methods (e.g. bounding box, wireframe) for each of its subclasses. In one embodiment, these display methods are overridden by equivalently named methods in the BaseObject's subclasses.

iv. Modifier

The Modifier class includes the methods for modifying objects during the rendering process. Instances of the Modifier's subclasses provide a set of very powerful and flexible features that greatly enhance the usability of the 3D modeling and animation application 145. Each instance of a Modifier subclass has methods for causing a particular modification of an object, such as a bend or a twist. Modifiers change the look of an object by, for example, changing the object's vertices or the object's topology. Modifiers can be stacked together so that the output of one modifier is fed into the input of another modifier. This provides a user with a virtually endless number of combinations. Modifiers can also be shared through references.

In one embodiment, each Modifier subclass modifies only specific types of objects. For example, in this embodiment, instances of the Bend class can modify geometric objects and shape objects while instances of the EditSpline class can only modify shape objects.

There are two main subclasses of Modifier: ObjectSpaceModifier and WorldSpaceModifier. These classes are described next.

v. ObjectSpaceModifier

The ObjectSpaceModifier class is a subclass of the Modifier class. The ObjectSpaceModifier class is the superclass of the object space modifier classes. Before further describing the class, the various coordinate spaces relevant to one embodiment of the invention are described.

Different spaces are used in one embodiment of the invention to differentiate different sets of spatial coordinate systems. In one embodiment of the invention there are two relevant spatial coordinate systems, object space and world space.

Object space is the coordinate system unique to each object in the scene 142. In one embodiment, every object has a local center and coordinate system defined by the location and orientation of the object's pivot point. The local center and coordinate system of an object combine to define that object's object space.

World space is the universal coordinate system used to track objects in a scene 142. World space relates the coordinates defining an object to the other objects in the scene 142. An object in a scene is located in world space by that object's position, rotation and scale (its transforms).

Returning to the description of the ObjectSpaceModifier class, instances of the subclasses of ObjectSpaceModifier modify an object in object space. For example, a bend is an object space modifier that causes an object's definition to change so that some portion of the object is bent relative to some other portion of that object.

The following describes the types of object space modifiers available in one embodiment of the invention. Object space modifiers can be divided into general, specialized and edit shape modifiers. The general object space modifiers have real-world equivalents and are relatively simple to understand. In one embodiment, the general object space modifiers include: bends, ripples, skews, tapers, twists, and waves. In this embodiment, the special modifiers include: displace, noise, and optimize. Also in this embodiment, the edit shape modifiers include edit splines, extrudes and lathes. In one embodiment, Bend, Ripple, Skew, Taper, Twist, Wave, Displace, Noise, Optimize, XForm, LinkedXForm, VolumeSelection, EditSpline, Extrude and Lathe are all subclasses of the superclass ObjectSpaceModifier.

Bend—produces a uniform bend in an object's geometry. The angle and direction of the bend is set as well as the bend axis. The bend modifier has a limit value that limits the bend to a particular section of an object's geometry.

Ripple—produces a concentric rippling effect in an object's geometry. The Size of the waves of the ripple are set. Ripple has a corresponding modifier in the world space.

Wave—produces a wave effect in an object's geometry. The size and phase of the wave is set. One embodiment of the invention supports a decay value that decreases or increases the size of the wave. Wave also has a corresponding world space modifier.

Skew—produces a uniform offset in an object's geometry. The amount and direction are set for each instance of skew. A skew's effect can also be limited so that only a portion of an object is skewed.

Taper—produces a tapered contour by scaling one end of an object's geometry. Each taper instance has values for the amount of tape and curve of the taper on two sets of axes. The taper's effect can also be limited to a section of the object's geometry.

Twist—produces a twist like a screw's thread in an object's geometry. Each instance of Twist has values for the angle of the twist on any of three axes, and a bias that compresses the threads relative to the pivot point of the object. The twist's effect can also be limited to a section of the object's geometry.

Displace—reshapes the geometry with a variable force. One embodiment of the invention has a corresponding Displace class that is a subclass of WorldSpaceModifier.

Noise—simulates random motion in an animated object. Noise also produces fractal effects that are useful in creating terrain features, for example.

Optimize—reduces the number of faces and vertices in an object. The purpose of Optimize is to simplify the geometry and increase the speed of rendering while maintaining an acceptable image.

XForm—acts as a transform for all or a portion of an object but is evaluated as a modifier. The importance of the order of execution of modifiers and transforms is described in greater detail below.

LinkedXForm—works in the same way as XForm except that the LinkedXForm uses the coordinate system of another object.

EditSpline—changes the splines, segments and vertices of a shape object. Shape objects are described below in conjunction with the description of the Object class.

Extrude—creates a 3D object by sweeping a shape along a straight line.

Lathe—creates a 3D object by revolving a shape along an axis.

(1) Manipulating Object Space Modifiers

Before describing world space modifiers, a description of a method of interacting with object space modifiers is provided. One embodiment of the invention not only allows a user to change the parameters of an object space modifier by directly entering the values of the parameters, but also allows the user to manipulate a 3D representation of the modifier.

In one embodiment, the 3D representation of the modifier is called a gizmo. The gizmo is a wireframe representation of that gizmo's modifier. A gizmo acts like a mechanical apparatus that transfers the modification to the object that gizmo is attached to. That is, by changing the gizmo, the user is changing the values of the parameters of the modifier. A user can move, scale and rotate a gizmo as is done with any other object.

In one embodiment, the gizmo represents parameters of a modifier that are not otherwise easily definable and/or accessible by a user. For example, a modifier may have a center, defined by an $\{x, y, z\}$ coordinate, a scale along each axis, and a rotation along each axis. This is a great deal of information. However, by providing the user with a three dimensional representation of this modifier information, the user can quickly visualize this information and change it, thereby changing these values and in turn changing the effect of the modifier on the object.

In one embodiment, world space modifiers also have gizmos. In another embodiment, an instance of a world space modifier uses a world space modifier object to change the parameters of the world space modifier.

vi. World Space Modifier

Like instances of the ObjectSpaceModifier class, instances of the WorldSpaceModifier class affect the appearance of other objects. The difference being that world space modifiers affect objects in world space coordinates. Also like the ObjectSpaceModifier class, WorldSpaceModifier has a number of subclasses that can be instanced to modify objects in different ways.

One or more objects are modified by a world space modifier by binding those objects to the world space modifier. In one embodiment, the binding process is performed by creating a reference between the world space modifier and each object that is bound to that world space modifier. A world space modifier has no effect on an object in a scene 142 that is not bound to the world space modifier. Importantly, when multiple objects are bound to the same world space modifier, the world space modifier's parameters affects all the objects equally. However, each object's distance from, and spatial orientation to, the world space modifier can change the world space modifier's effect. Because of this spatial effect, simply moving an object through the world space can change the world space modifier's effect. This last feature provides a user with a powerful tool in animations. For example, to show a dolphin swimming, a user need only model the dolphin and then bind the dolphin to an instance of a Wave world space modifier. As the dolphin object translates through the world space, the dolphin will be modified by the wave to appear to be swimming. Additionally, an object can be bound to multiple world space modifiers.

In one embodiment, each world space modifier includes a graphical representation of itself. As noted above, this graphical representation is a gizmo in one embodiment, and in another embodiment, this graphical representation is an instance of a subclass of the Object class.

The following is a list of subclasses of WorldSpaceModifier, in one embodiment:

Bomb—explodes a geometric object into individual faces that over time become disjoint in space. Thus, the Bomb subclass is particularly useful in animations.

Deflector—acts as a shield to repel the particles generated by a particle system object. A deflector can be used to simulate pavement being struck by rain, or a rock in the middle of a waterfall.

Displace—acts much like the ObjectSpaceModifier Displace class except the effect is in world space.

Gravity—simulates the effects of gravity on particles generated by a particle system object. Gravity instances are directional. To create a waterfall with a rock in the middle, instances of Gravity and Deflector classes can be combined.

Ripple—acts much like the ObjectSpaceModifier Ripple class except the effect is in world space.

Wave—acts much like the ObjectSpaceModifier Wave class except the effect is in world space.

Wind—simulates the effect of wind blowing particles generated by a particle system object.

As noted above, each Modifier subclass knows which objects it can modify. In the above embodiment, the Bomb, Display, Gravity, Ripple and Wave classes modify geometric objects. The Deflector, Displace, Gravity and Wind modifiers modify particle system objects.

One embodiment of the invention includes a plug-in architecture that allows additional object space and world space modifiers to be added to the 3D modeling and animation application 145.

vii. Object

As noted above, the term object refers to something in the scene 142. In one embodiment, all objects are defined by three general properties: a collection of creation parameters, a pivot point, and a bounding box. The properties describe the form, local origin, initial orientation, and the extent of an object.

The Object class is the superclass of all the different types of objects in a scene. In one embodiment, the Object class has the following subclasses: GeomObject (geometry object), ShapeObject, WorldSpaceModifierObject, and DerivedObject.

The GeomObject class is the superclass of basic renderable objects, such as tubes, cylinders, boxes, polyhedra, spheres, torus, and cones. One embodiment of the invention includes the following geometric object categories.

Standard Primitives—3D geometric objects such as Box, Sphere, and Cylinder.

Patch Grids—are 2D surfaces.

Particle Systems—are animated objects that simulate rain, snow, dust and similar collections of small objects.

Shapes—include 2D objects line lines and donuts and 3D spline-based shapes like a helix. Shape objects are not directly renderable in one embodiment. The shape objects need to first be modified before they are renderable.

World Space Modifier Object—is not a renderable object, but is still visible to the user. A world space modifier object is like a gizmo for an object space modifier. The world space modifier object provides a visual representation of a world space modifier that allows the user to bind an object to the corresponding world space modifier.

Derived Object—includes a list of modifier objects and a pointer to the master object. In rendering a scene, a user always sees a derived object, even if no modifiers are applied to an object. The reason for this is that the derived object not only ensures that a that particular object. The caching abilities of the derived objects is an important performance enhancing feature of one embodiment of the invention and is described in greater detail below.

The above class hierarchy illustrates only one class hierarchy. Other embodiments include other class hierarchies. For example, in one embodiment, the classes under the ShapeObject are moved under the GeometricObject class. In another embodiment, the methods in the Animatable, ReferenceMaker and ReferenceTarget classes are combined into the BaseObject class. In another embodiment, the ReferenceTarget is a superclass of the ReferenceMaker. In another embodiment written in a language that supports multiple inheritance, ReferenceMaker does not inherit from Animatable, nor does BaseObject inherit directly from ReferenceTarget, however the Modifier class and the Object class multiply inherit from the Animatable, ReferenceTarget and BaseObject.

E. Pipeline for Rendering

Figure 2:
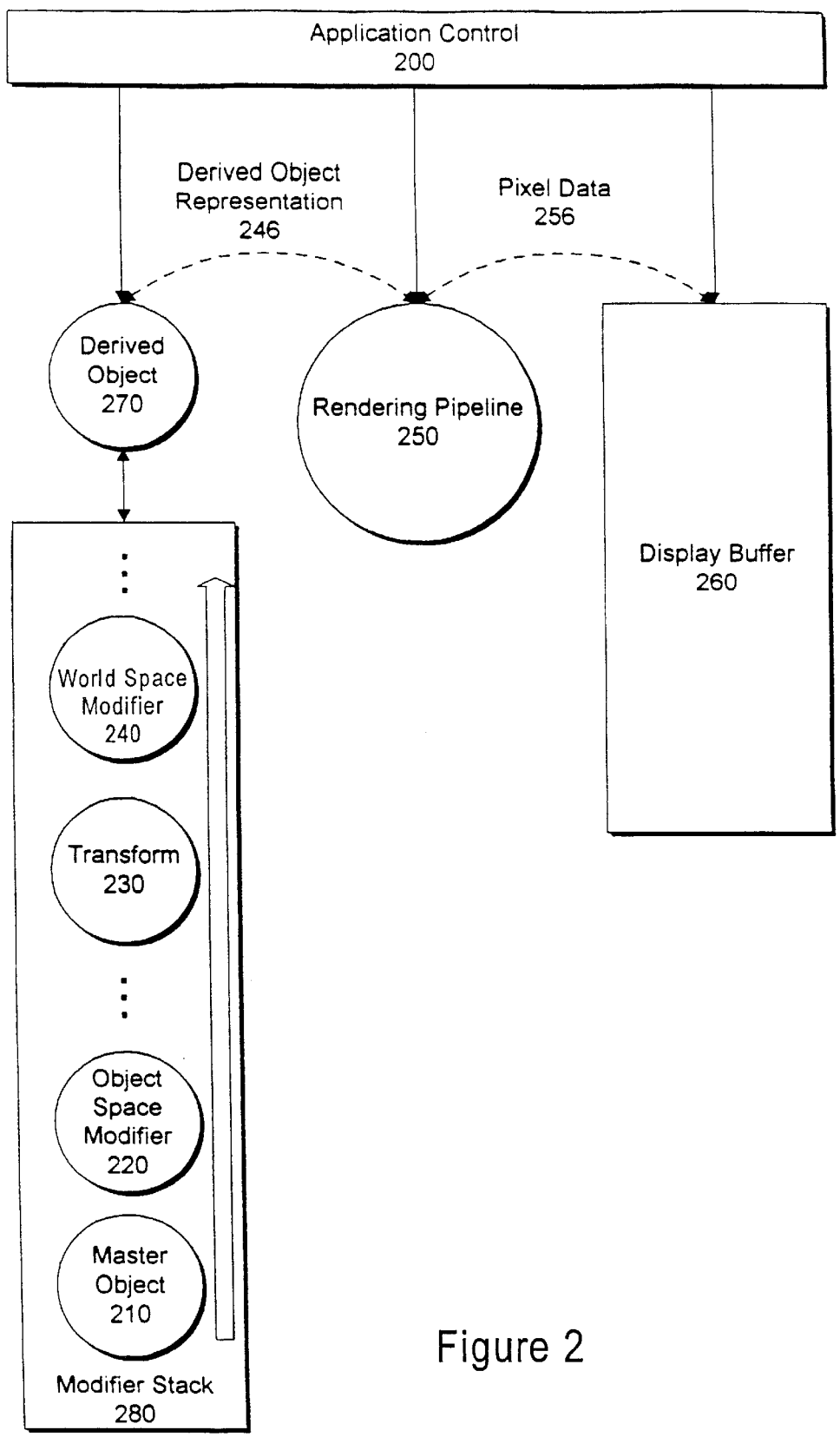
FIG. 2 illustrates a how objects are rendered in the 3D modeling and animation system of FIG. 1.

FIG. 2 and the following describe how objects in a scene 142 are rendered in one embodiment of the 3D modeling and animation application 145. So as not to obscure this embodiment of the invention, FIG. 2 has been simplified. The following first describes the elements of FIG. 2 and then the operation of those elements.

FIG. 2 includes an application control module 200, a derived object 270, a modifier stack 280, a master object 210, an object space modifier 220, a transform 230, a world space modifier 240, a rendering pipeline 250 and a display buffer 260. These elements work together to render a graphical representation of the derived object onto the display device 130.

The application control 200 controls the operation and interaction between the elements of FIG. 2. In one embodiment, the application control 200 includes the 3D Studio Max™ core software architecture. However, what is important is that there is some method of controlling the various elements in FIG. 2.

The derived object 270 is part of a scene 142 (not shown) and is responsible for ensuring that a modified object is properly rendered. The derived object is an instance of the DerivedObject class. The derived object instance is created when a user creates an object in a scene.

In one embodiment, each derived object 270 maintains a modifier stack 280. In one embodiment, the modifier stack 280 includes a list of modifiers (e.g. object space modifier 220 and world space modifier 240), a transform, and a pointer to a master object 210. In another embodiment, the derived object 270 maintains a reference to the master object 210, a reference to the transform 230, and a list of modifiers.

However, what is important is that the derived object 270 maintains the information necessary to generate a description of a modified object (labeled as the derived object representation 246).

A more detailed description of the elements in the modifier stack 280 is now provided. The master object 210 includes a parametric definition of an instance of a subclass of Object (e.g. the topology (e.g., mesh, direction of faces) and geometry (e.g., vertices and edges)). Importantly, the user does not see the master object 210 but sees the rendered result of the modifiers and transform identified by the derived object 270. The object space modifier 220 is an instance of a subclass of the class ObjectSpaceModifier. The transform 230 is responsible for transforming points in the object space coordinate system to corresponding points in the world space coordinate system. Unlike modifiers, the transform 230 are independent of an object's internal structure. The transform 230 acts directly on the object's local coordinate system. The local coordinate system for an object can be expressed as a matrix of values that specify the following information in world space: position of the object's center, rotation of the object in world space, and the scale of the object along its local axes. The world space modifier 240 is an instance of a subclass of the class WorldSpaceModifier. The modifier stack 280 includes zero or more object space modifiers and world space modifiers.

In response to a request for a representation of itself, the derived object 270 provides the application control 200 with a derived object representation 246. Depending on the type of rendering being done and the type of master object 210, the derived object 270 will provide a bounding box, topology, geometry and/or texture map description of the modified and transformed master object 210. How the derived object 270 creates the derived object representation 246 is described below.

The derived object representation 246 is then used by the rendering pipeline 250 to create a bit pixel data 256 representation of the modified and transformed object. The rendering pipeline 250 includes processes for converting the parameter information in the derived object representation 246 into pixel data. In one embodiment, the rendering pipeline includes rendering processes such as smoothing, highlighting, facets, lit wireframe, wireframe and bound box. In one embodiment, known rendering techniques are used in the rendering pipeline 250. The pixel data 256 includes the pixel information for display on display device 130. The display buffer 260 holds the pixel data for display by the display device 130.

How the derived object 270 creates the derived object representation 246 is now described. When a derived object 270 is asked by the application control 200 to provide a renderable description of itself, the derived object 270 evaluates the master object 210, then any object space modifiers, the transform, and then any world space modifiers, to generate the derived object representation 246. That is the master object 210 provides the basic description of the object. This basic description is then provided to the first object space modifier in the modifier stack 280. The object space modifier modifies this basic description to generate a modified description. The next object space modifier is then evaluated to modify the previous modified description. This process continues until each object space modifier has been evaluated. Importantly, the object space modifiers are evaluated in the order they appear in the object modifier stack 280. Next the transform 230 is evaluated. Each derived object 270 has only a single transform 230 and that transform is always evaluated after the object space modifiers 220. If a user wishes to apply a transform before one or more object space modifiers, the user can use an instance of the XForm object space modifier class. After the transform 230, the world space modifiers 240 are evaluated. The world space modifiers are evaluated in a manner similar to the object space modifiers. In particular, the world space modifiers 240 are evaluated in the order that they are added to the modifier stack 280.

As noted above, the modifier stack 280 makes modeling and animation significantly easier for the user. Some advantages of having the modifier stack 280 are described below.

F. Using the Modifier Stack

This section describes how to use the modifier stack 280 and provides examples of using the modifier stack for modeling and animation. FIG. 3 through FIG. 7 illustrate an example of creating and modifying a tube using a modifier stack 280. FIG. 8 through FIG. 11 illustrate an example of animating a cylinder using a modifier stack 280.

i. Modeling and the Modifier Stack

Figure 3:
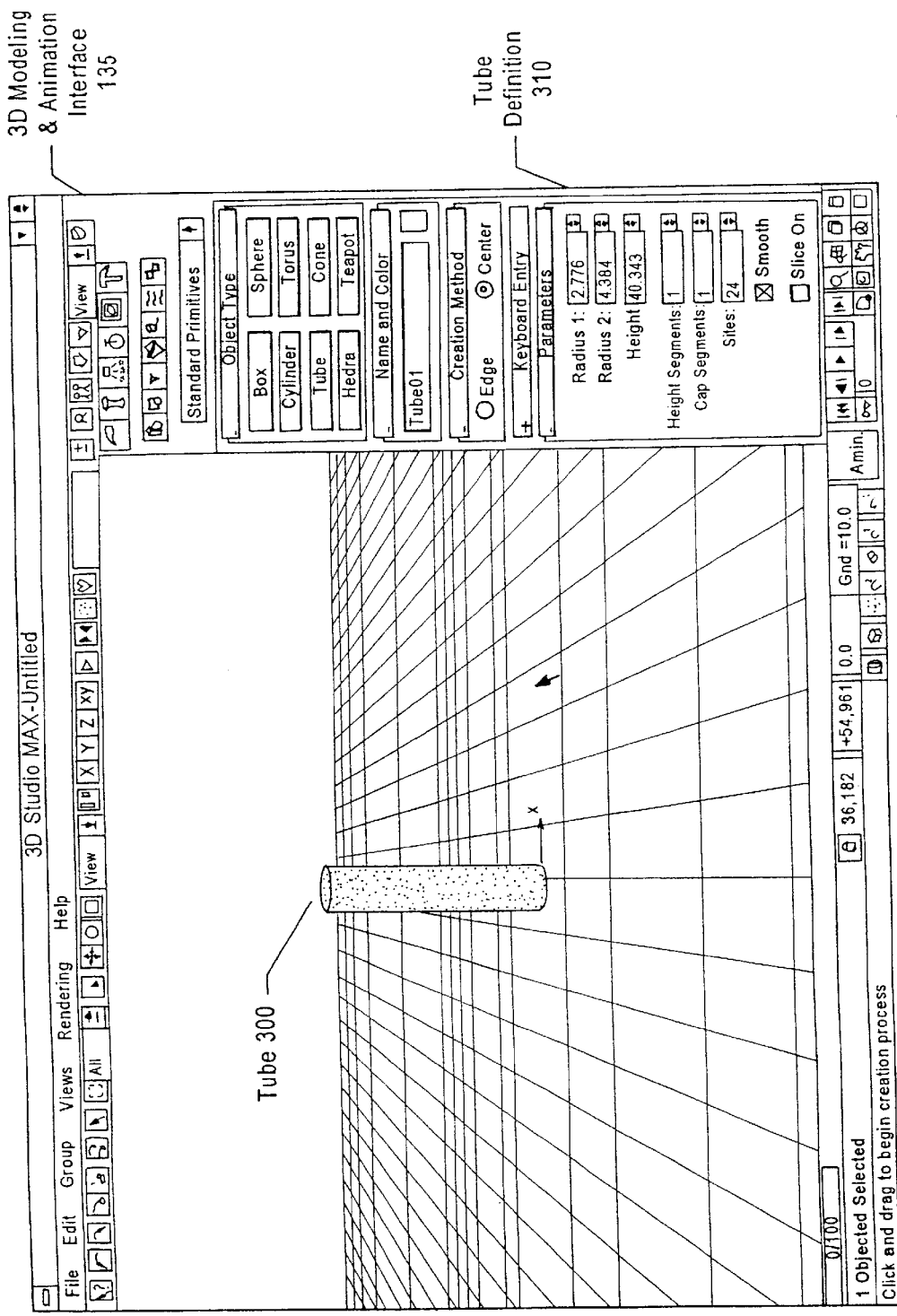
FIG. 3 illustrates an object.

Each time a new object is instantiated by a user, a derived object 270 is created. In the example of FIG. 3, a tube 300 is created and rendered to the 3D modeling and animation interface 135. To the right of the interface, the parameters defining the tube are shown in the tube definition 310. At this point, the modifier stack 280 only includes the reference to the tube master object 210 and the transform 230 for the tube.

Figure 4:
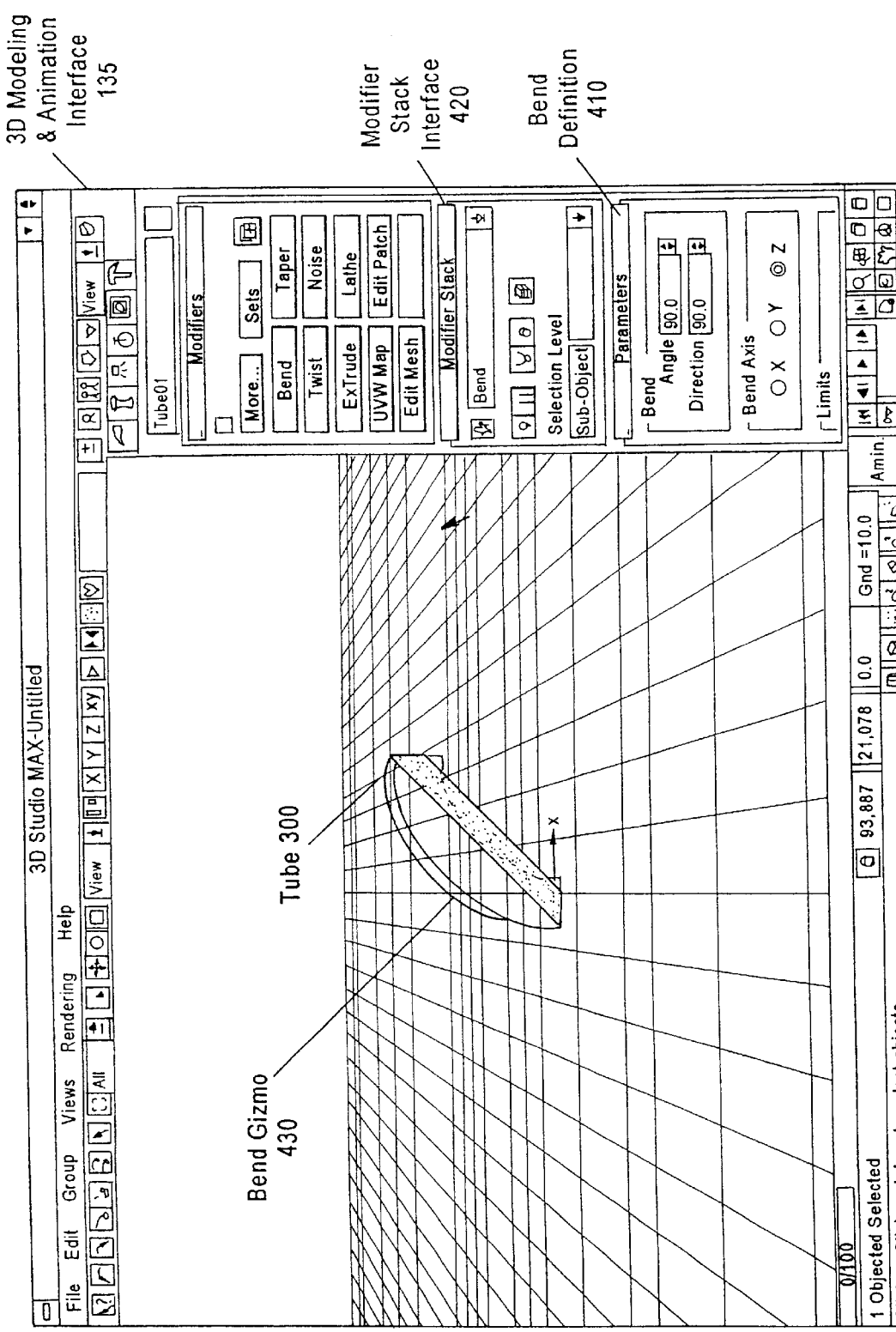
FIG. 4 illustrates an object having an object space modifier and corresponding gizmo.

FIG. 4 illustrates a bend modifier as it is applied to the tube 300. When the tube 300 is selected, the 3D modeling and animation interface displays the modifier stack interface 420 for the tube 300. The modifier stack interface 420 shows that the bend modifier has been selected for display. Because the bend is selected, the bend definition 410 appears. The bend definition 410 shows the parameters for the bend. In this case, the angle of the bend is ninety degrees and the direction is ninety degrees, both along the Z axis.

Also shown in FIG. 4 is an example of a gizmo, the bend gizmo 430. The bend gizmo allows the user to change the values of the bend modifier without having to enter the values directly into the bend definition 410 interface.

Figure 5:
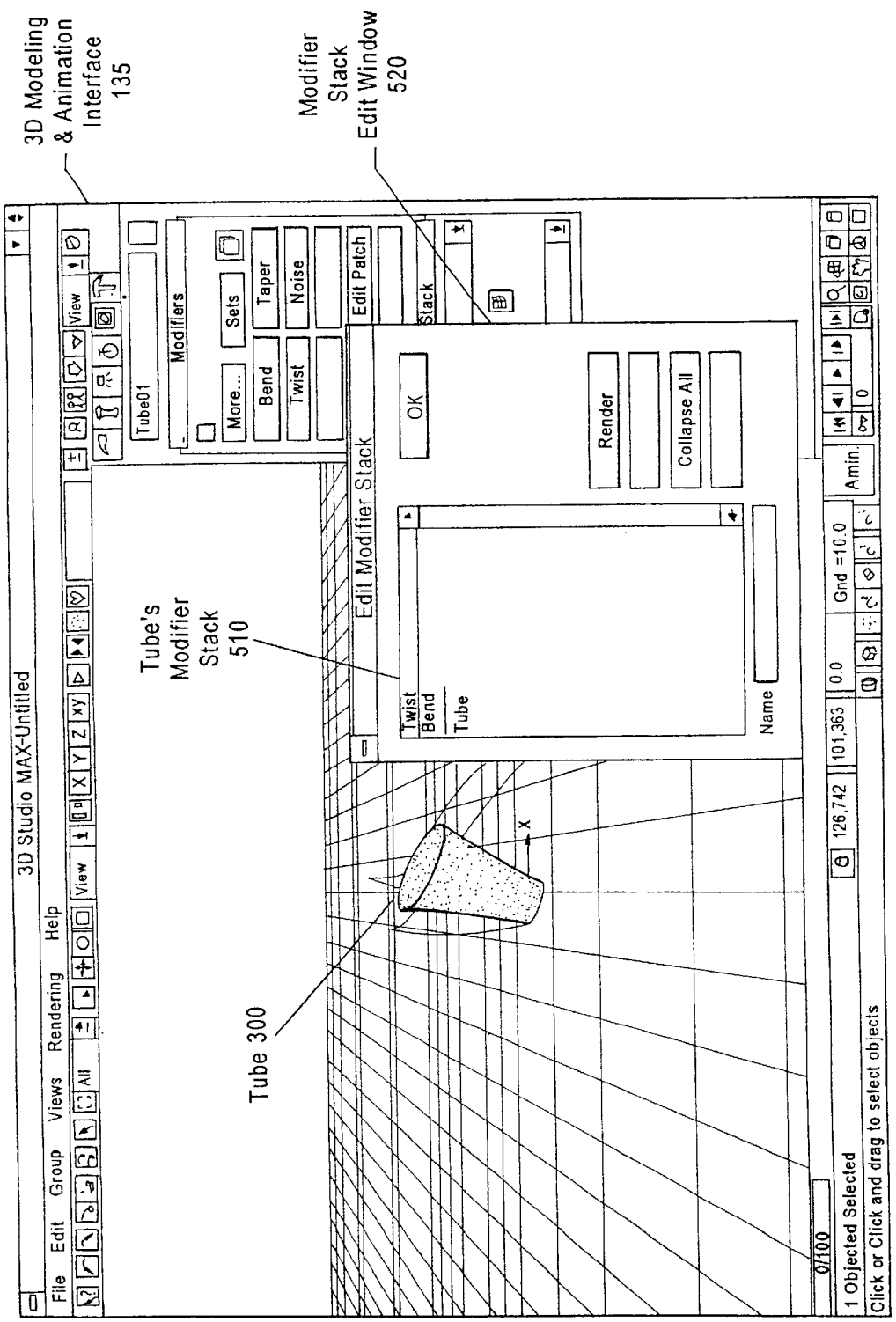
FIG. 5 illustrates a second object space modifier applied to the object of FIG. 4.

FIG. 5 illustrates an additional twist modifier as it is applied to the bent tube 300. The modifier stack edit window 520 is also displayed. The modifier stack edit window 520 shows that the tube 300 has a bend applied first and then a twist. Importantly, the modifier stack 280 allows a user to easily add modifiers to an object and view not only the results of the new modifiers but also view a list of all the modifiers that apply to an object.

The modifier stack 280 also allows a user to edit modifiers that are anywhere in the modifier stack 280. For example, the user can change the values of the bend modifier without having to "undo" the twist modifier first.

In one embodiment, the user can change the order of the modifiers. As noted above the order of evaluation of the modifiers is important for some modifiers. For example, applying a bend before a twist can have a significantly different look than applying a twist before the bend.

Figure 6:
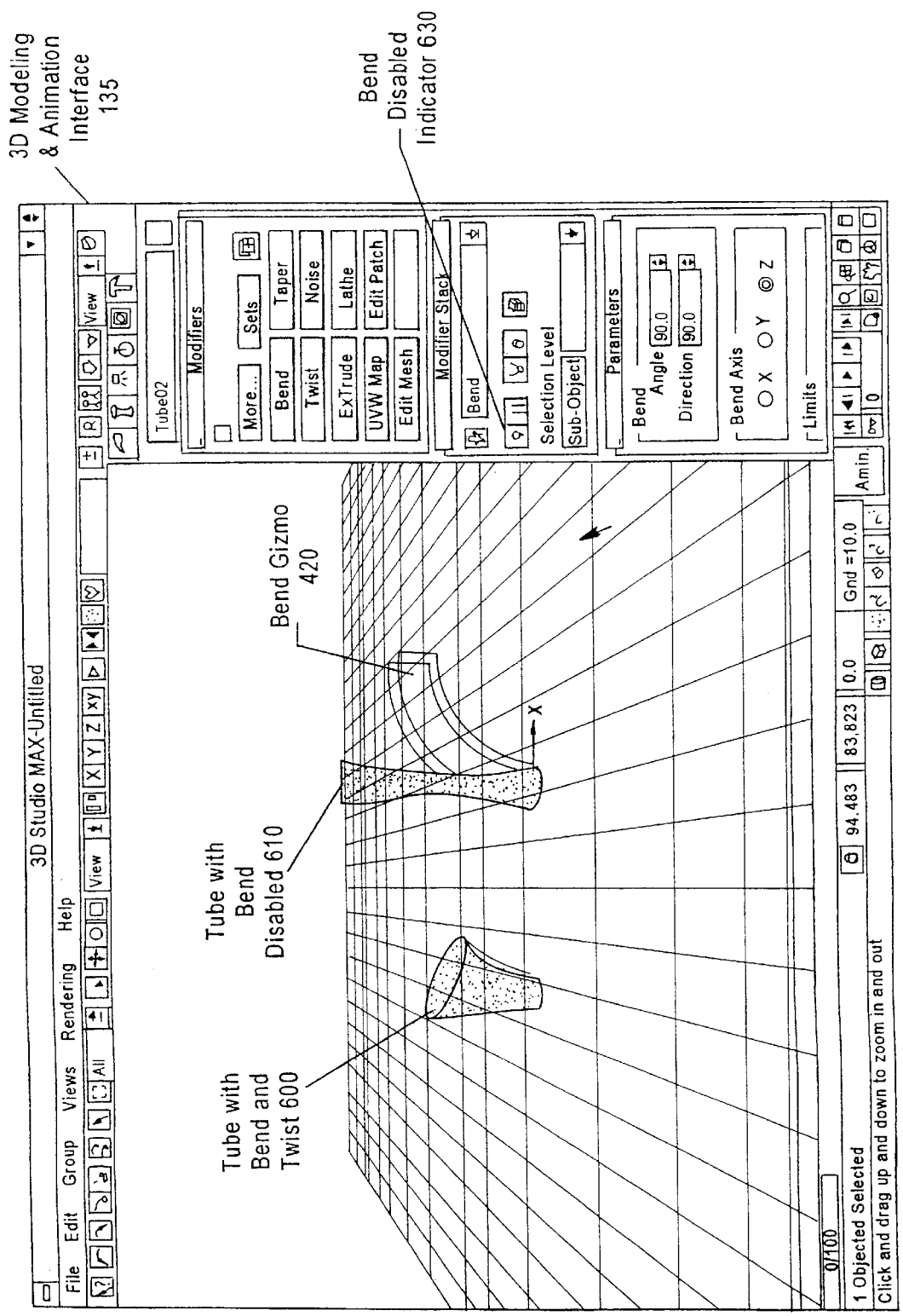
FIG. 6 illustrates changes to the modifier stack of the object of FIG. 5.

Additionally, the user can disable a particular modifier, but keep the modifier in the modifier stack 280. FIG. 6 illustrates an example of this feature. The tube with the bend and twist 600 is the same tube as is illustrated in FIG. 5. The tube with the bend disabled 610 shows the same modified object except that the bend modifier has been disabled in this tube's modifier stack. The bend disabled indicator 630 indicates that the bend modifier for the tube 610 has been disabled. In one embodiment, to enable the bend, the user need only select the bend disabled indicator 630.

Figure 7:
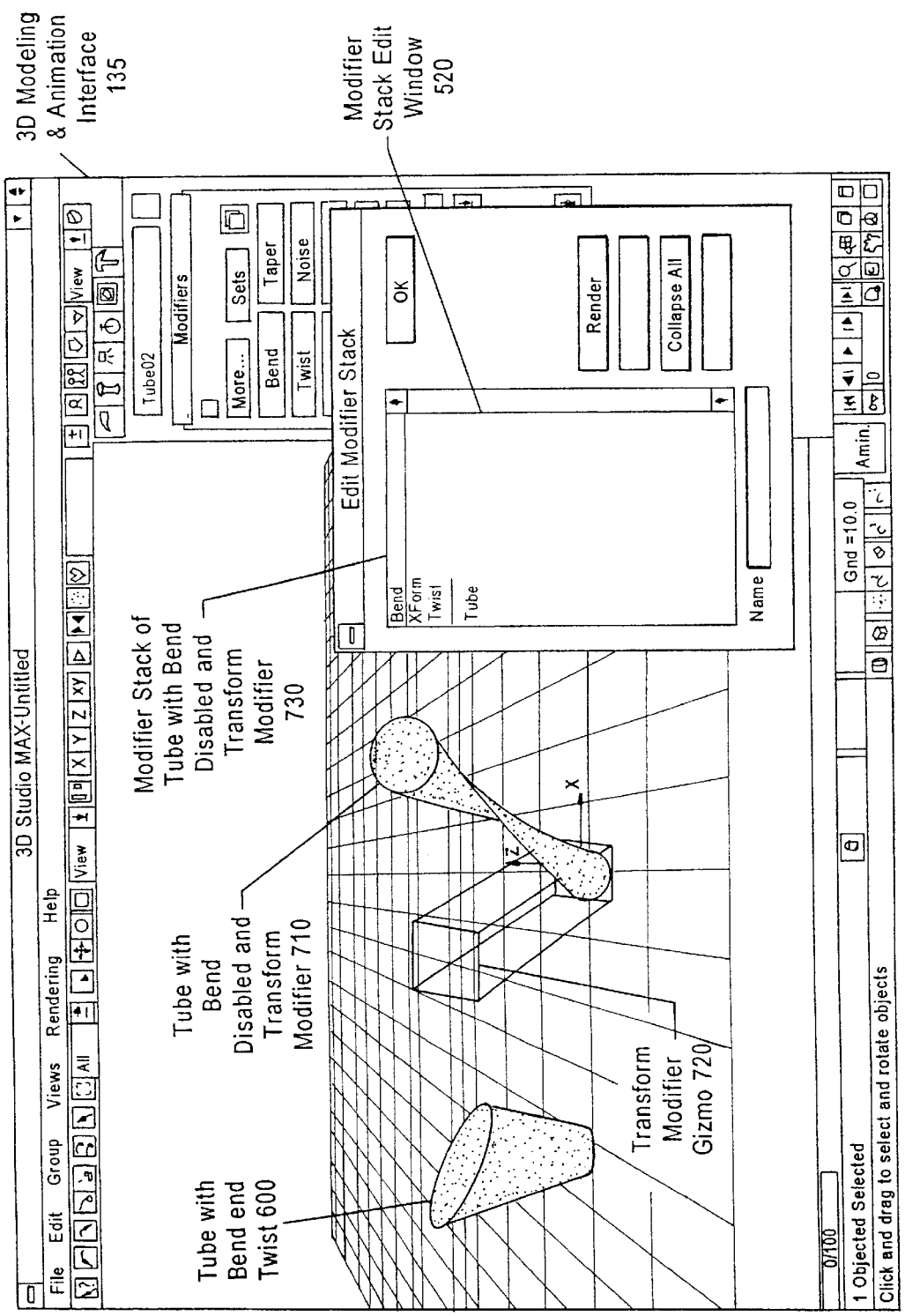
FIG. 7 illustrates further changes to the modifier stack of the object of FIG. 5.

FIG. 7 illustrates the tube with a bend and twist 600 as well as a tube with a bend disabled and a transform modifier 710. The modifier stack of the tube with the bend disabled and the transform modifier 730 is also shown. Importantly, the user was able to easily change the order of the twist and bend, keep the bend disabled, and insert an XForm instance between the two modifiers.

ii. Animation and the Modifier Stack

As noted above, in addition to helping in modeling, the modifier stack 280 is helpful in animating a model. Before describing the examples of FIG. 8 through FIG. 11, it is helpful to describe the animation process first.

The user creates key frames that record values of various parameters at the beginning and end of each animated sequence. The values at the keyframes are called keys. The 3D modeling and animation application 145 determines the interpolated values between each key to produce "between frames" that complete the animation. The 3D modeling and animation application 145 can animate many parameters in a scene 142. For example, modifier parameters can be animated such as a bend angle, and a taper amount.

Note that other embodiments of the invention allow the user to create an animation by not using key frames but by using controllers which are not key based, e.g., noise.

Figure 8:
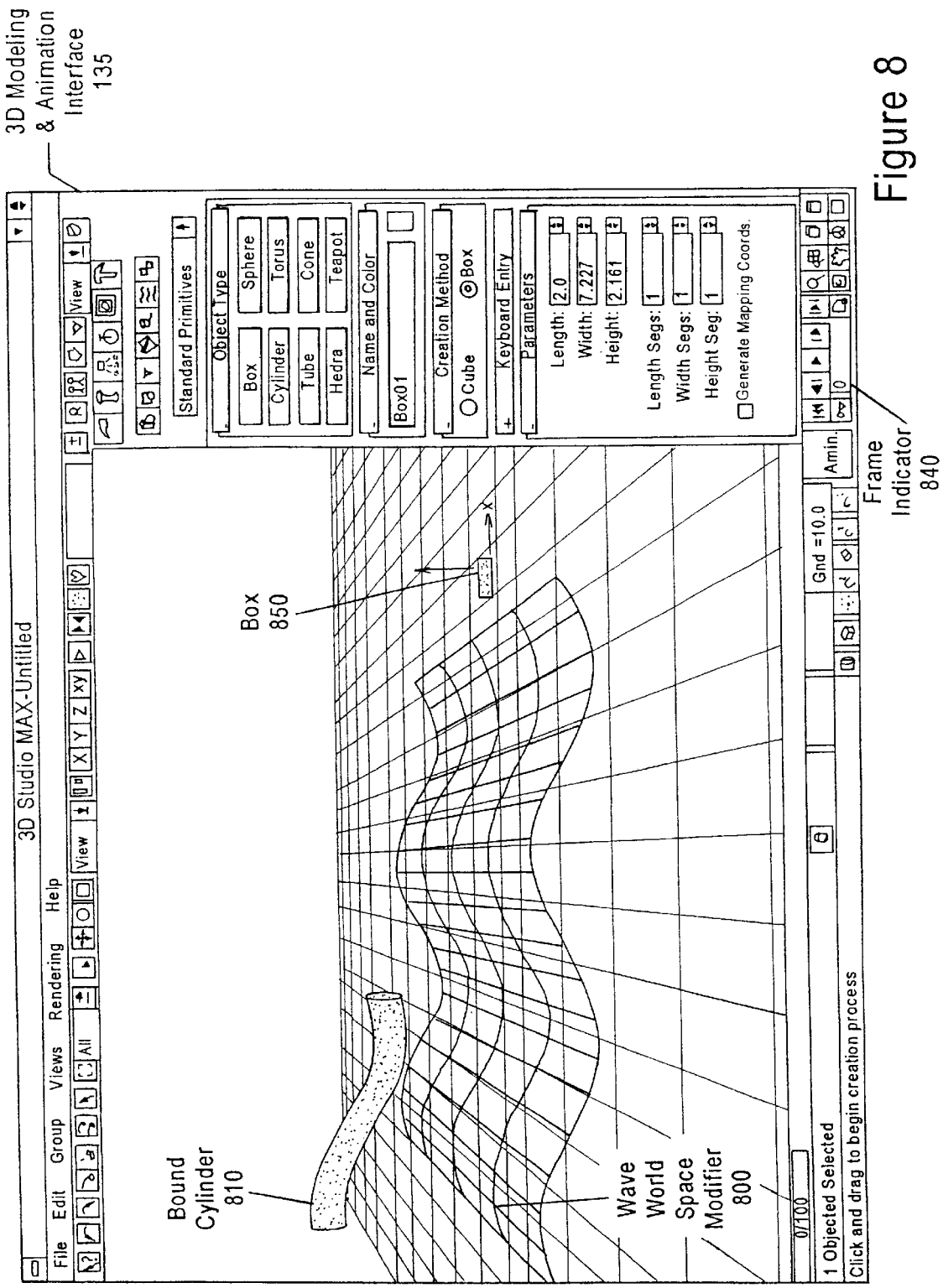
FIG. 8 illustrates a key frame and the start of an animation sequence.
Figure 9:
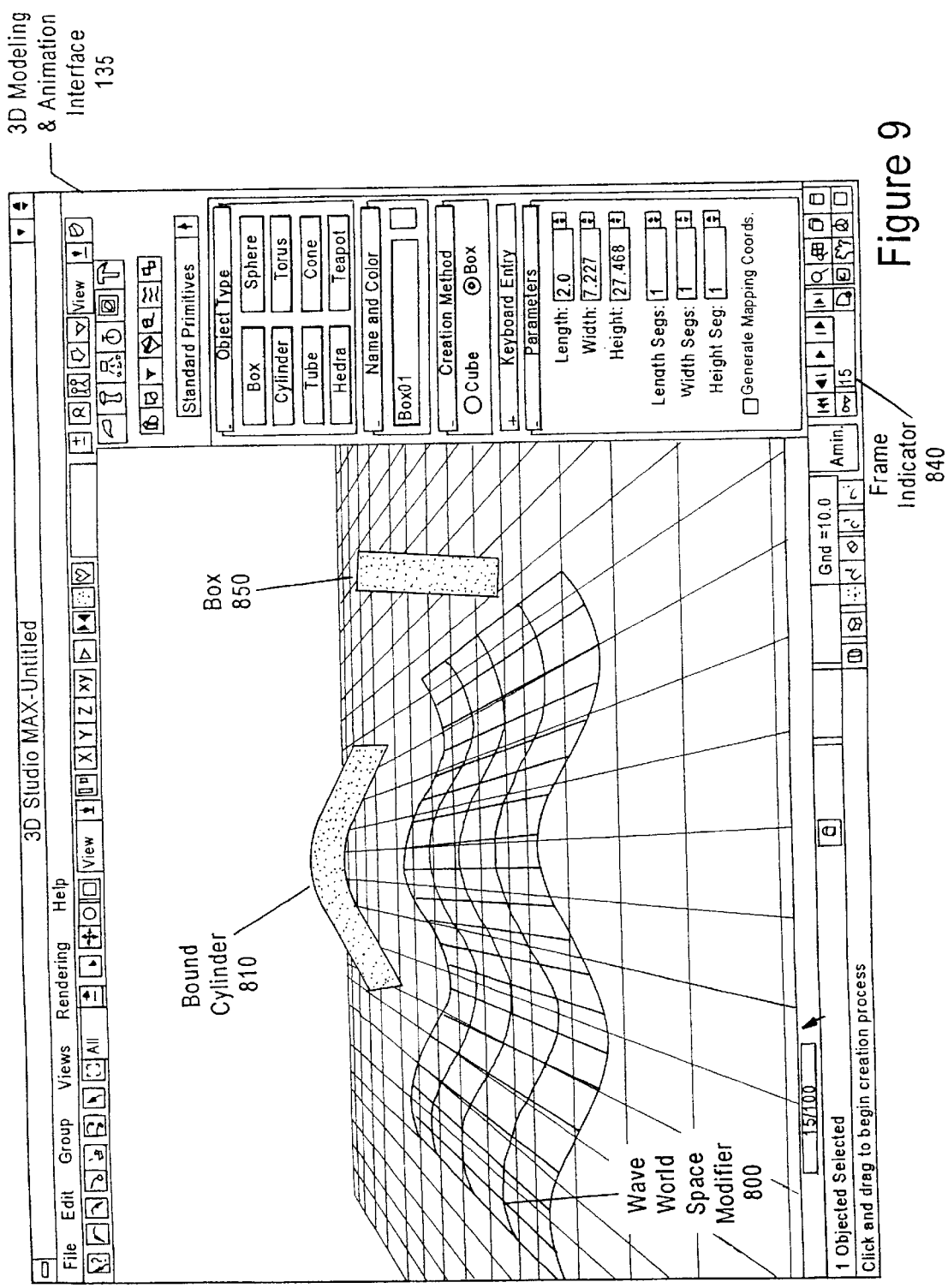
FIG. 9 illustrates a "between frame" of the animation sequence.
Figure 10:
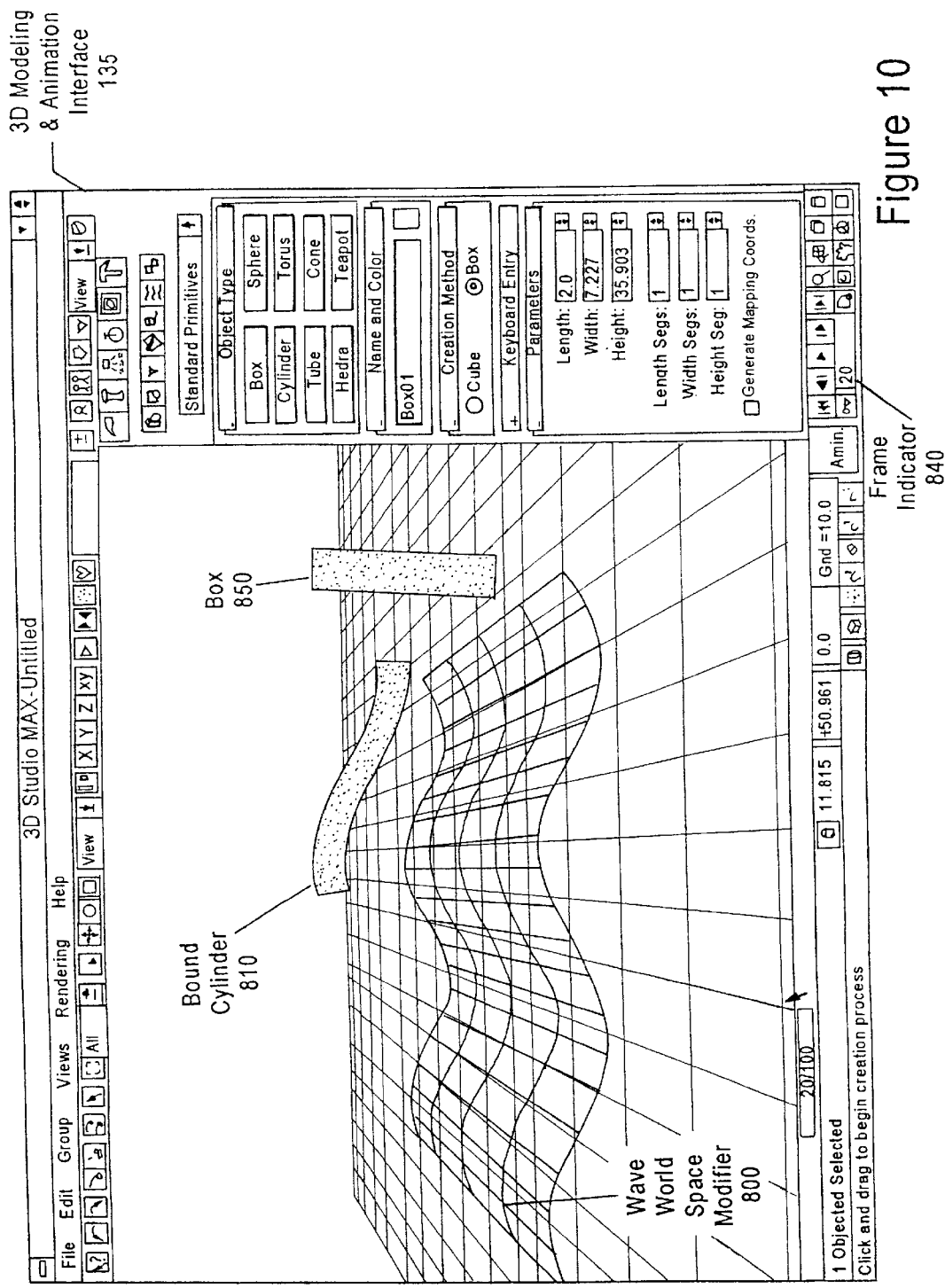
FIG. 10 illustrates a second key frame of the animation sequence.
Figure 11:
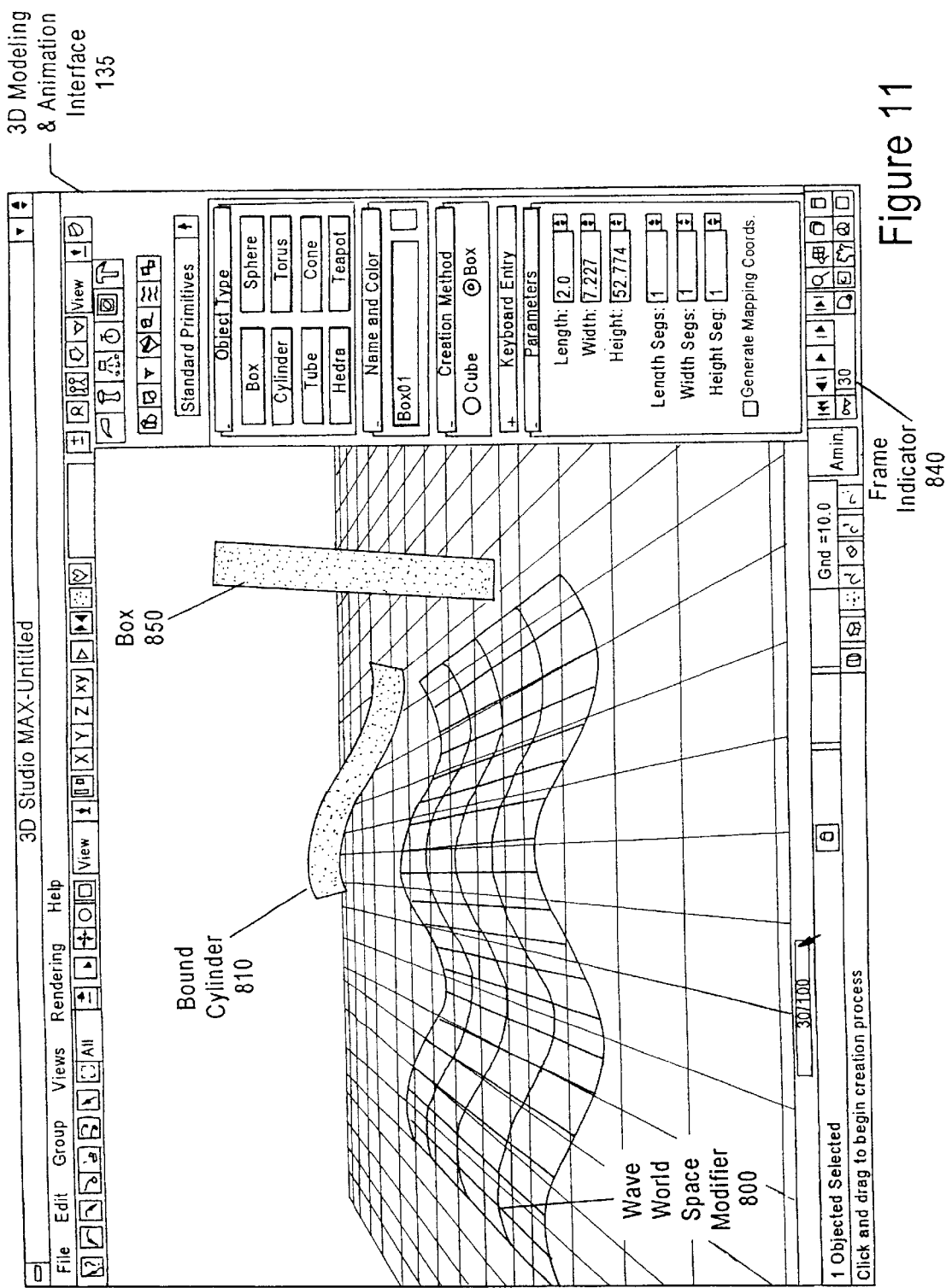
FIG. 11 illustrates a third key frame of the animation sequence.

FIG. 8 illustrates the beginning of a thirty frame animation sequence (frame zero is shown in the frame indicator 840). FIG. 9 illustrates results of the animation at frame fifteen. FIG. 10 illustrates the results of the animation at frame twenty. FIG. 11 illustrates the end of the animation sequence at frame thirty.

The elements in FIG. 8 through FIG. 11 are: the bound cylinder 810, the wave world space modifier 800 and the box 850. The bound cylinder 810 is bound to the wave world space modifier 800.

FIG. 8 shows the bound cylinder 810 rendered to the left side of the perspective view. The box 850 is relatively short. FIG. 8 is a key frame that defines the position, size, rotation, and the effects of any modifiers on the bound cylinder 810 and the box 850 at frame zero of the animation.

FIG. 9 shows the bound cylinder 810 partly translated to the right. FIG. 9 is not a key frame, but an interpolated frame from the values defined in the frame zero key frame and the key frame at frame twenty. Note that the wave world space modifier 800 has modified the look of the bound cylinder 850. Also shown in FIG. 9 is that the box is now taller than in FIG. 8.

FIG. 10 shows the key frame where the bound cylinder 810 has completed its translation across the screen. To create this key frame. the user accessed the modifier stack 280 of the bound cylinder at frame twenty and chanced the position of the bound cylinder 810 by modifying the values of the transform 230 for the bound cylinder 810. The 3D modeling and animation application 145 interpolated the values of the transform at the key frame zero and the key frame twenty to create the between frames including the between frame shown in FIG. 9.

FIG. 11 shows the last key frame in the sequence, frame thirty. In this frame, the bound cylinder 810 has not changed location because after frame twenty, there were no more key frames that affected the bound cylinder 810. However, frame thirty has a key value for the box 850. Thus, the box 850 has continued to grow in size from frame twenty. Again to enable the box to grow until frame thirty, the user had previously changed the value of the transform in the modifier stack 280 of the box 850 at frame thirty.

Importantly, the user can animate many of the parameters in the modifier stacks 280 of the objects in a scene. Thus, the animation of objects is much easier than in previous systems.

G. Caching

As noted above, one embodiment of the invention provides a significant speed increase over prior systems. This embodiment of the invention achieves the speed increase by caching portions of the derived object representation 246 within each derived object 270. The following describes how the values of the derived object representation 246 are determined and then how these values are cached.

i. Channels

In one embodiment of the invention, each derived object 270 provides the derived object representation 246 in response to a request to provide that information. However, the contents of that information may vary depending on the type of request. For example, a bounding box representation need not have the same detailed information as a smoothed representation. Additionally, during an animation, for example, only part of a derived object representation 246 may change. For example, as shown in FIG. 8 through FIG. 11, during the animation, the topology of the bound cylinder does not change, but the geometry does change. Therefore, even though the same request may be made of the derived cylinder (e.g., wireframe representation request), only the geometry values are changing in each frame of the animation. Given that different types of data may need to generated because of the different types of messages, and that even for the same request only some of the data may change in the next frame, one embodiment of the invention divides the derived object representation 246 creation into value generating channels.

A channel corresponds to a different portion of a derived object representation 246. Each channel is responsible for generating its own portion of the derived object representation 246. Each element in the modifier stack 280 affects values in one or more of the channels. The results of an evaluation of a modifier in a channel is called an channel intermediate result. In one embodiment, providing a derived object representation 246 includes determining which channels need to be accessed. Next, evaluating the elements in the modifier stack 280 that affect the values in those channels. Evaluating the elements affecting that channel involves generating a series of channel intermediate results until the last element is evaluated. The results of evaluating the last element in the modifier stack is that channel's portion of the derived object representation 246.

For example, the transform 230 affects values in at least the geometry channel in the derived object representation 246. Therefore, an evaluation of the transform 230 in the geometry channel generates a set of geometry channel intermediate results. These intermediate results can then be passed onto the next element in the modifier stack 280 that effects the geometry channel. When the last element is evaluated, the geometry values are included in the derived object representation 246.

Figure 12:
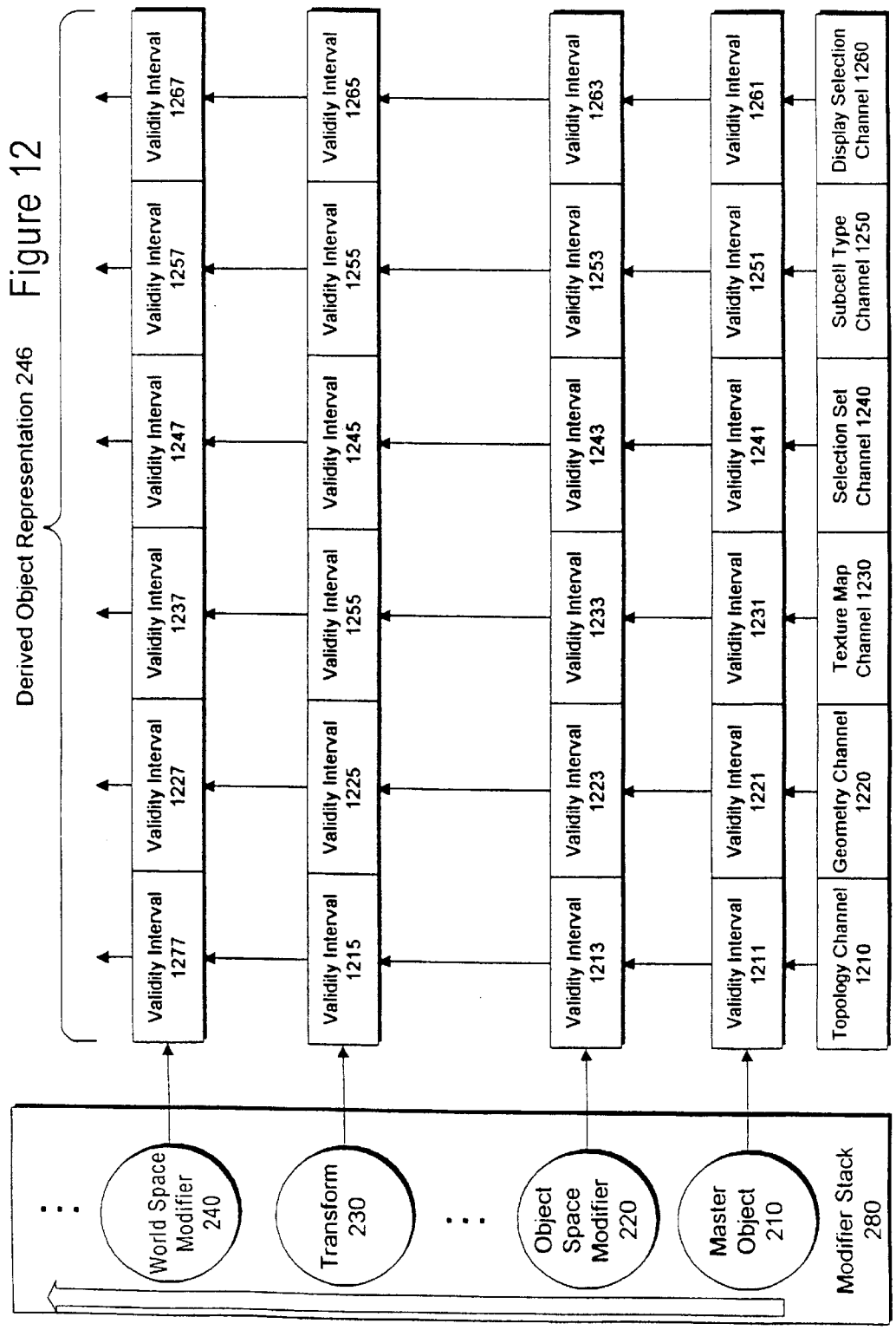
FIG. 12 illustrates an example of the use of channels in generating a derived object's representation.

As shown in FIG. 12, one embodiment supports a topology channel 1210, a geometry channel 1220, a texture map channel 1230, a selection set channel 1230, a subcell type channel 1250 and a display selection channel 1260. The topology channel 1210 determines the topology (e.g., the normal direction of the faces an object) of the derived object 270. The geometry channel 1220 determines the geometry (e.g., vertices) of the derived object 270. Most modifiers modify the geometry of the derived object 270. The texture map channel 1230 determines the texture mapping coordinates of any texture mapped to the derived object 270. The selection set channel 1240 determines an array of bits indicating which vertices are selected by a selection modifier. The subcell type channel 1250 determines the type of selection (e.g., for a mesh object, the selection type can be an edge or a vertex). The display selection channel 1260 determines how parts of the derived object are to be displayed (e.g., are vertices ticks to be displayed for the derived object 270). Not every derived object 270 needs all of these channels. For example, if no texture map is mapped onto an object, the texture map channel 1240 is not needed by the derived object 270.

ii. Caching in Channels

One embodiment of the invention includes the caching of the intermediate channel results. This embodiment of the invention not only includes determining the intermediate channel results, but also determining a time period for which those results are valid. This time period is called the validity interval. An example of a validity interval is where, for frame nineteen of the animation in FIG. 8 through FIG. 11, the bound cylinder 810 has a geometry channel 1220 validity interval, for the wave world space modifier 800, of frame twenty to frame infinity. Because the length of time an intermediate result of the derived object 270 is known to be valid, the validity interval helps optimize the caching of the intermediate channel results.

As shown in FIG. 12, each element in the modifier stack 280 has an associated validity interval in each topology channel. For example, the object space modifier 220 has a validity interval 1213 for the topology channel 1210, a validity interval 1223 for the geometry channel 1220, a validity interval 1233 for the texture map channel 1230, a validity interval 1243 for the selection set channel 1240, a validity interval 1253 for the subcell type channel 1250 and a validity interval 1263 for the display selection channel 1260.

Figure 13:
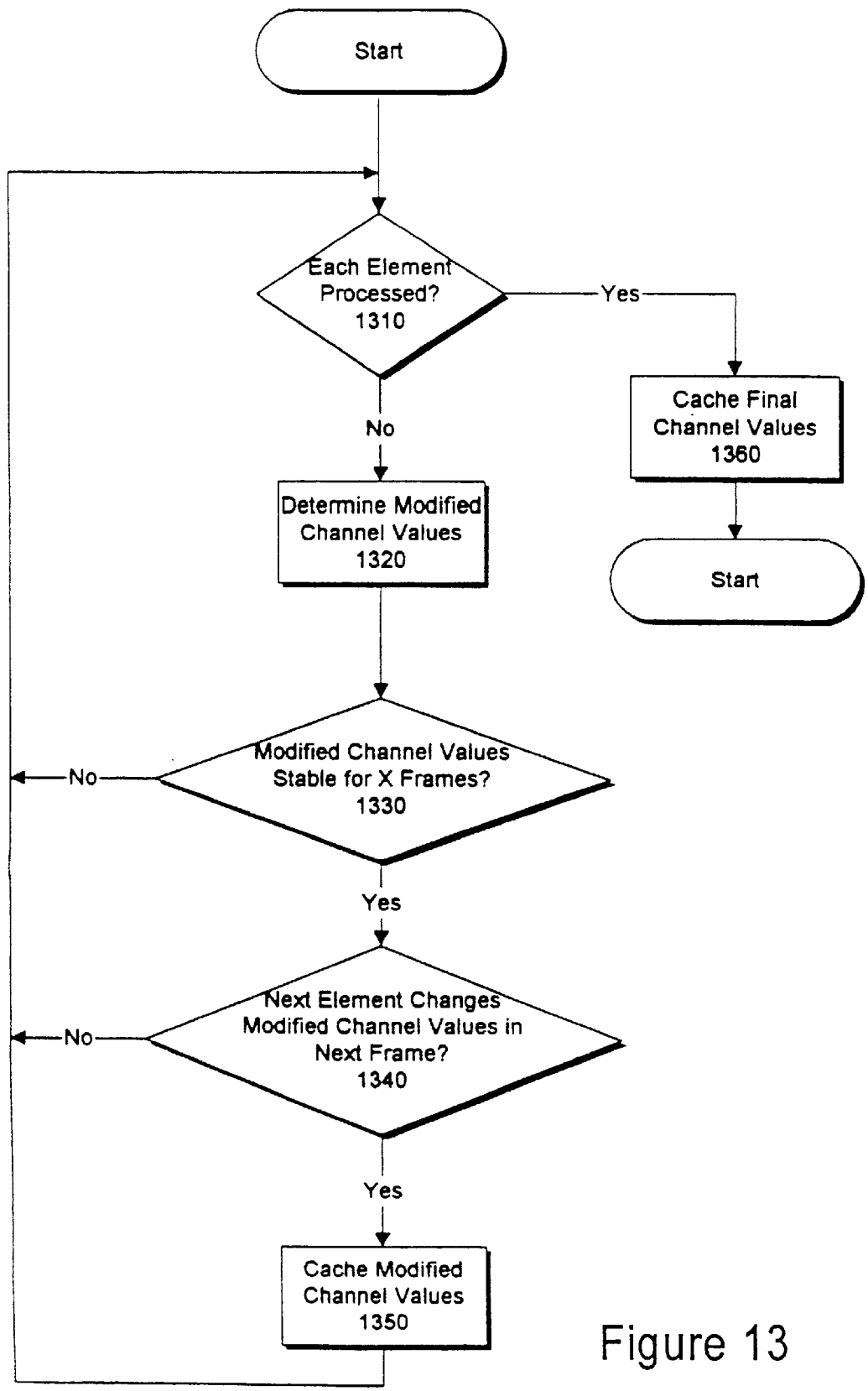
FIG. 13 illustrates one embodiment of a method of caching.

In conjunction with FIG. 13, the following describes how the validity interval is used in the caching process. FIG. 13 illustrates the process of determining what to cache during the evaluation of elements for a specific channel of a derived object 270.

Prior to the first step in FIG. 13, the derived object 270 has received a request to provide a corresponding derived object representation 246. The derived object 270 then determines which channels need to be evaluated. The derived object 270 also is aware of the time (e.g., which frame) the request is being made for.

At step 1310, a test is made to determine whether each element in the modifier stack 280 has been processed. If all the elements have been processed, then step 1360 is performed. Otherwise, step 1320 is performed. In one embodiment, this includes testing whether the "present element" is the last element in the modifier stack 1280.

At step 1320, the next element in the modifier stack 1280, now identified as the "present element", generates a corresponding set of intermediate channel results for that particular element and channel.

At step 1330, the validity interval is determined, if not already determined from the last execution of these steps, for the present element. The present element's validity interval is tested to determine whether the present element is valid for the next X frames. (In another embodiment, the validity interval is tested to determine whether the present element's intermediate results are valid for a predetermined time period, a number of frames being only one example of the time period.) In one embodiment, X is ten. If the present element's validity interval is valid for the next X frames, then step 1340 is executed. Otherwise, step 1310 is executed.

At step 1340, the validity interval for the next element after the present element in the modifier stack 280 is generated. This validity interval is tested to determine whether the intermediate results generated by the next element are valid for a predetermined period of time (e.g., the next frame, or the next five frames). If the next element is the top of the modifier stack, then this test returns false. The next elements validity interval is stored in one embodiment for use in step 1330 during the next iteration of these steps. If the next element's validity interval is not valid for the predetermined period of time, then the step 1350 is executed. Otherwise, step 1310 is executed.

At step 1350, the intermediate channel results generated in step 1310 are stored in a cache for this derived object. Because of the tests performed in step 1330 and step 1340, the system knows that the data in the cache is valid for at least the next N frames. Therefore, the next time this channel is evaluated (e.g., the next frame), rather than evaluating all of the elements in the modifier stack 280 below the present element, the derived object need only begin the evaluation at the next element in the modifier stack 280 for this channel.

At step 1360, the results of evaluating the last element in the modifier stack 280 are cached. The results of the last element in the modifier stack 280 represent that channel's portion of the derived object 270. Therefore, in one embodiment, if an derived object 270 is requested to provide its derived object representation 246, with nothing changed in the derived object 270, that derived object 270 need only provide the cached value. This greatly reduces the number of evaluations performed in the system.

Figure 14:
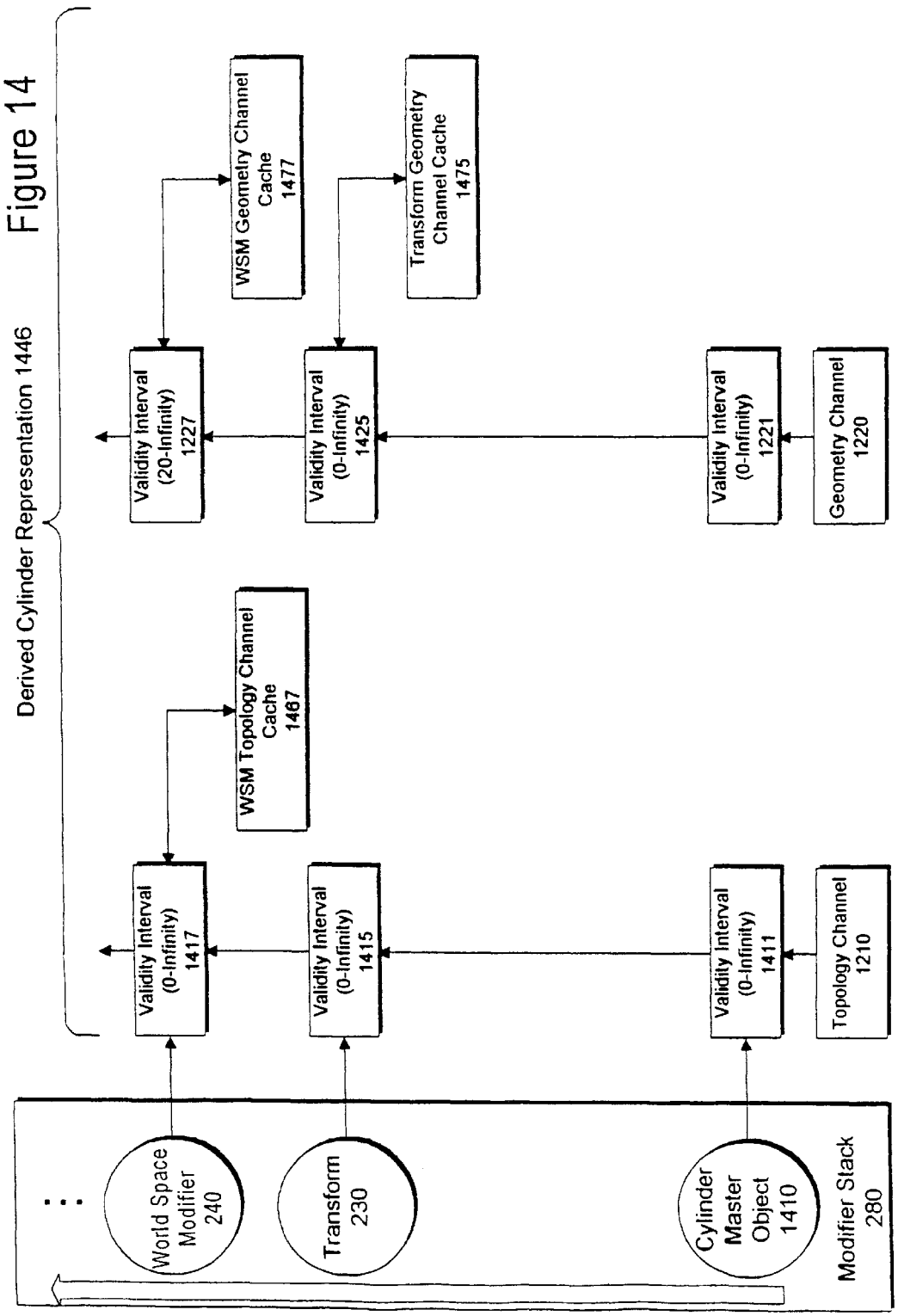
FIG. 14 illustrates an example of caching.

FIG. 14 illustrates one example of the caching performed for the bound cylinder 810. In the example of FIG. 14, the cache is shown for frame nineteen of the animation. Also, in this example, only the topology channel 1210 and the geometry channel 1220 are shown. The following describes how the steps of FIG. 13 are used to cache intermediate results in the topology channel 1210 and the geometry channel for the bound cylinder 810. The value for "X" in step 1330 is ten in this example.

For the topology channel 1210, first step 1310 is executed which leads to step 1320. At step 1320, the cylinder master object is accessed (the present element of the bound cylinder's modifier stack) and the intermediate topology channel results are generated. In this case, the intermediate topology channel results are the GeometricObject instance topology definition with no modifications. At step 1330, the topology channel validity interval 1411 for the cylinder master object is determined to be zero to infinity. Also at step 1330, the validity interval 1411 is determined to be greater than ten frames; therefore, step 1340 is executed. At step 1340, the validity interval 1415 for the transform 230 is determined to also be zero to infinity. Therefore, the intermediate topology channel results for the cylinder master object are not cached.

Step 1310 through step 1350 are repeated for each of the transform and the wave world space modifier 800. Because step 1340 evaluates as false during the processing of the elements effecting the topology channel 1210, no intermediate channel results are cached during these steps. However, at step 1360, the final results for the topology channel are stored in the world space modifier topology channel cache 1467. Thus, the results in the cache 1467 are valid for at least the next ten frames of an animation.

Step 1310 through step 1360 are then executed for all the elements that affect the geometry channel 1210. Note that during the processing of the transform element 230, at step 1340, the interval level 1227 for the next element indicates that the intermediate channel results generated for the next element will not be valid in the next frame of the animation. Thus, step 1350 is executed resulting in the caching of the intermediate channel results in the transform geometry channel cache 1475. Therefore, in the next animation frame, the bound cylinder need only begin evaluating the geometry channel 1220 from the intermediate channel results in the cache 1475 instead of from the cylinder master object 1410 intermediate channel results. Where an object has many modifiers, being able to use the intermediate channel results from a modifier, greatly improves the speed of the system because many calculation are saved. At step 1360, the geometry channel 1220 portion of the derived cylinder representation 1446 is stored in the WSM geometry channel cache 1477.

Note also that the combination of lazy evaluation and the caching in the channels further improve the speed of the system. Lazy evaluation of the channels further reduces the number of unnecessary calculations the entire derived object representation may not be needed to be recalculated in response to a broadcast of changes through a reference from another object. That is, only certain channels may be affected by a set of changes therefore only the caches in these channels need be invalidated.

What is claimed is:

1. A method of modifying the representation of an object in a three dimensional modeling system comprising:

displaying a first three dimensional representation of said object;

displaying a three dimensional representation of a modifier to be applied to said object for altering a shape of said object in association with the first three dimensional representation of the object, the representation of the modifier having a shape defined by one or more modifier parameters that are associated with the modifier, and the representation of the modifier having a shape indicating an approximate resulting shape of the object when the modifer is applied to the object;

receiving a selection corresponding to a change to one of the modifier parameters;

re-displaying said three dimensional representation of said modifier based on the changed modifier parameter;

applying said modifier to said object; and generating and displaying a second three dimensional representation of said object from said object and said modifier, wherein said second three dimensional representation of said object is deformed with respect to said first three dimensional representation.

2. A method of modifying a first visual representation of a virtual object displayed by a graphical modeling system on a graphical display device, comprising the computer-implemented steps of:

defining, by information stored in a storage device, one or more modifiers that may be applied to the object to thereby change a shape of the object, wherein each of the modifiers comprises information defining a modifier type, one or more modifier parameters, and a value associated with each of the modifier parameters;

displaying the modifiers by displaying a wireframe in association with the first visual representation of the object, the wireframe having a shape defined by the one or more modifier parameters that are associated with the modifiers, and the wireframe's shape indicating an approximate resulting shape of the object when the modifiers are applied to the object;

applying the modifiers to the object; and generating and displaying a second visual representation of the object based on the object and a particular modifier of the one or more modifiers, wherein said second visual representation of said object is deformed with respect to said first visual representation.

3. The method recited in claim 2, in which the step of applying the modifiers to the object further comprises the steps of:

storing the modifiers in an ordered stack; and applying the modifiers to the object according to an order of the modifiers in the stack.

4. The method recited in claim 2, further comprising the steps of:

defining, by information stored in a storage device, an object space coordinate system having its center at a pivot point of the object;

applying an object space modification operation with each of the modifiers in which the object space modification operation modifies the object only within the object space coordinate system.

5. The method recited in claim 4, in which the step of applying comprises the step of applying, with each of the modifiers, the object space modification operation selected from among bend, ripple, skew, taper, twist, wave, displace, noise, optimize, edit spline, extrude, or lathe operations.

6. The method recited in claim 2, further comprising the steps of:

receiving a selection corresponding to a change to a particular modifier parameter associated with the particular modifier;

re-displaying the modifiers by displaying the wireframe representation of the modifier based on the changed modifier parameter;

applying the particular modifier to the object; and generating and displaying a third three dimensional representation of the object from the object and the particular modifier.

7. The method recited in claim 6, in which the step of displaying the modifiers by displaying the wireframe further comprises the step of:

displaying a graphical gizmo adjacent to the first visual representation of the object, in which a shape of the graphical gizmo is defined by a visual modification operation to be carried out by the particular modifier, and one or more parameter values associated with the particular modifier.

8. The method recited in claim 7, further comprising the steps of:

receiving a user input that defines a move, scale, or rotate operation to be carried out on the graphical gizmo; and moving, scaling, or rotating the graphical gizmo on the display in response to the user input.

9. The method recited in claim 2, further comprising the steps of:

defining, by information stored in a storage device, a world space coordinate system that contains the object;

defining one or more world space modifiers that represent graphical modification operations that can be carried out on all objects that are within the world space coordinate system; and binding the object to the one or more world space modifiers;

whereby the one or more world space modifiers operate to graphically modify all objects that are within the world space coordinate system and that are bound to the one or more world space modifiers.

10. A method of modifying a first visual representation of a virtual object displayed by a graphical modeling system on a graphical display device, comprising the computer-implemented steps of:

defining, by information stored in a storage device, one or more modifiers that may be applied to the object to thereby change a shape of the object, wherein each modifier comprises information defining a modifier type, one or more modifier parameters, and a value associated with each of the modifier parameters;

applying a particular modifier to the object by:

displaying a three dimensional wireframe in association with the first visual representation of the object, the wireframe having a shape defined by one or more modifier parameters that are associated with the particular modifier, and the wireframe's shape indicating an approximate resulting shape of the object when the particular modifer is applied to the object;

generating and storing a derived object based on the object and the modifiers; and generating and storing a derived object representation based on the derived object; and generating and displaying a second visual representation of the object based on the derived object representation, wherein said second visual representation of said object is deformed with respect to said first visual representation.

11. The method recited in claim 10, in which the step of generating and storing the derived object further comprises the steps of:

storing, in association with the object, a modifier stack comprising a list of zero or more modifiers, information identifying a transform operation to be carried out on the object, and information identifying a master object associated with the object; and generating the derived object based on the modifier stack.

12. The method recited in claim 11, in which the step of storing the modifier stack further comprises the step of storing the information identifying the master object, comprising a parametric definition of an instance of the object.

13. The method recited in claim 12, in which the step of storing the modifier stack further comprises the step of storing the information identifying the transform operation, in which the transform operation transforms points of the object in an object space coordinate system that is centered about the object into points in a world space coordinate system.

14. The method recited in claim 11, further comprising the steps of:

displaying the modifier stack in a user interface of the modeling system;

receiving user input that identifies a re-ordering of the modifier stack; and re-ordering the one or more modifiers in the modifier stack according to the user input.

15. The method recited in claim 11, in which the step of generating and storing the derived object representation based on the derived object includes the ordered steps of:

requesting the derived object to provide a renderable description of itself;

evaluating the master object;

evaluating one or more object space modifiers that are in the list of zero or more modifiers, in order;

evaluating the transform operation;

evaluating one or more world space modifiers that are in the list of zero or more modifiers, in order;

whereby the derived object representation is generated.

16. A three-dimensional modeling system that executes a method of modifying a first visual representation of a virtual object displayed on a graphical display device, the method comprising the computer-implemented steps of:

creating and storing information in a storage device that defines one or more modifiers that may be applied to the object to change a shape of the object, wherein each modifier comprises a modifier type value and one or more modifier parameter values;

displaying the modifiers in a graphical user interface;

displaying a wireframe in association with the first representation of the object, the wireframe having a shape defined by one or more modifier parameters that are associated with a particular modifier of the one or more modifiers, the wireframe's shape indicating an approximate resulting shape of the object when the particular modifer is applied to the object;

applying the modifiers to the object; and generating and displaying a second visual representation of the object based on the object and the particular modifier, wherein said second visual representation of said object is deformed with respect to said first visual representation.

17. The system recited in claim 16, in which the step of applying the modifiers to the object further comprises the steps of:

storing the modifiers in an ordered stack;

displaying the modifiers according to the order of the modifiers in the stack in the graphical user interface; and applying the modifiers to the object according to the order.

18. The system recited in claim 17, further comprising the steps of:

receiving a selection corresponding to a change to a particular modifier parameter associated with the particular modifier;

re-displaying the second visual representation based on the changed modifier parameter;

applying the particular modifier to the object; and generating and displaying a third visual representation of the object from the object and the particular modifier.

19. The system recited in claim 16, further comprising the steps of:

defining, by information stored in a storage device, an object space coordinate system having its center at a pivot point of the object;

applying an object space modification operation with each of the modifiers in which the object space modification operation modifies the object only within the object space coordinate system.

20. The system recited in claim 19, in which the step of applying comprises the step of applying, with each of the modifiers, the object space modification operation selected from among bend, ripple, skew, taper, twist, wave, displace, noise, optimize, edit spline, extrude, or lathe operations.

* * * * *

UNITED STATES PATENT AND TRADEMARK OFFICE
CERTIFICATE OF CORRECTION

PATENT NO. : 6,650,339 B1
DATED : November 18, 2003
INVENTOR(S) : Silva et al.

It is certified that error appears in the above-identified patent and that said Letters Patent is hereby corrected as shown below:

Title page,
Item [22], change filing date from "March 31, 1999" to -- April 29, 1999. --

Column 17,
Line 35, replace "modifer" with -- modifier --;

Column 18,
Line 30, replace "representation of the modifier based on the change," with
-- based on the change --, Column 19,
Line 18, replace "modifer" with -- modifier --;

Column 20,
Line 21, replace "modifer" with -- modifier --;

Signed and Sealed this

Sixth Day of April, 2004

JON W. DUDAS
*Acting Director of the United States Patent and Trademark Office*